United States Patent
Kolonko et al.

(10) Patent No.: US 9,389,629 B2
(45) Date of Patent: Jul. 12, 2016

(54) MEASURING ARRANGEMENT FOR DETERMINING A MEASURED VARIABLE AND METHOD FOR GENERATING AN OUTPUT SIGNAL RELATING TO THE MEASURED VARIABLE

(71) Applicant: KROHNE Messtechnik GmbH, Duisburg (DE)

(72) Inventors: Christian Kolonko, Oberhausen (DE); Steffen Dymek, Oberhausen (DE); Martin van der Linde, Oberhausen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 286 days.

(21) Appl. No.: 13/887,475

(22) Filed: May 6, 2013

(65) Prior Publication Data

US 2014/0176092 A1    Jun. 26, 2014

(30) Foreign Application Priority Data

Dec. 20, 2012 (DE) .......................... 10 2012 024 893

(51) Int. Cl.
*G05F 1/625* (2006.01)
*G01F 1/32* (2006.01)

(52) U.S. Cl.
CPC .............. *G05F 1/625* (2013.01); *G01F 1/3209* (2013.01); *G01F 1/329* (2013.01); *G01F 1/3218* (2013.01)

(58) Field of Classification Search
CPC ....... G01F 15/024; G01F 1/3254; G01F 1/86; G01F 25/0007; G01F 1/3218; G01N 9/26; G01R 31/2829; G05F 3/02; G05F 1/625
USPC ............................................... 73/1.16, 861.22
See application file for complete search history.

(56) References Cited

U.S. PATENT DOCUMENTS

| | | | |
|---|---|---|---|
| 5,372,046 A * | 12/1994 | Kleven et al. .............. 73/861.22 |
| 7,042,228 B2 * | 5/2006 | Lally et al. ..................... 324/527 |
| 7,358,744 B2 | 4/2008 | Scholz |
| 7,853,415 B2 * | 12/2010 | Cook et al. ...................... 702/45 |
| 2007/0150547 A1 * | 6/2007 | Cook et al. ..................... 709/212 |
| 2014/0347033 A1 * | 11/2014 | Dymek ....................... 324/76.11 |

FOREIGN PATENT DOCUMENTS

DE    26 37 295 A1    2/1978
DE    10 2007 035 710 A1    2/2009

* cited by examiner

*Primary Examiner* — Freddie Kirkland, III
(74) *Attorney, Agent, or Firm* — David S. Safran

(57) ABSTRACT

A method for generating an output signal and measuring arrangement for determining at least one measured variable use at least one sensor device (2) and at least one signal output (3) for outputting at least one output signal, wherein the output signal transmits information about the measured variable and/or a state of the measuring arrangement using at least one predetermined value of the current. The measuring arrangement ensures reliable outputting of an error signal indicating the presence of an erroneous state is achieved in that a first adjusting unit (4) and a second adjusting unit (5) are provided that set the value of the current of the output signal to a predetermined desired value. The first adjusting unit (4) sets a fixed current value and the second adjusting unit (5) sets a variable current value.

10 Claims, 2 Drawing Sheets

MEASURING ARRANGEMENT FOR DETERMINING A MEASURED VARIABLE AND METHOD FOR GENERATING AN OUTPUT SIGNAL RELATING TO THE MEASURED VARIABLE

BACKGROUND OF THE INVENTION

1. Filed of the Invention

The invention relates to a measuring arrangement for determining at least one measured variable with at least one sensor device and at least one signal output for outputting at least one output signal, wherein the output signal transmits information about the measured variable and/or a state of the measuring arrangement using at least one predetermined value of the current. For example, the measured variable is the flow, the fill level, the pH or the temperature of a medium. Further, the invention relates to a method for producing an output signal, wherein at least one piece of information about a measured variable and/or state of a measuring arrangement is transmitted at least by a current value of the output signal. The value of the current is, in particular, for example, half the peak-to-peak value.

2. Description of Related Art

In modern process automation, different measuring devices—an alternative term is field device—are used for determining or monitoring measured variables in order to monitor or control processes. For hazardous or safety-critical applications, the measuring devices—or as a general term: measuring arrangements, which may also include an interconnection of separate components for measurement—must meet a heightened level of security. Conversely, the measuring devices must provide a measure of reliability, which is commonly described using the assurance level or the Safety Integrity Level (SIL). In this case, the higher the level, the lower the risk of malfunction. For detection of an error state, corresponding measuring devices are equipped with a functionality that serves to monitor individual components or the entire measuring device.

If an error is detected, then this is indicated, on the one hand—particularly using a corresponding error signal—and on the other hand, the measuring devices change—particularly for critical errors—mostly into a safe state.

A measuring arrangement generally has at least one sensor device, which is used for determining the respective measured variable or even a number of measurement variables, and at least one signal output for outputting an output signal. The sensor device produces a measurement signal on the basis of a measurement, which is output, for example, directly via the signal output, or which is processed or at least partially processed in the measuring arrangement. The processing may mean, for example, that the actual value of a process variable that is of interest is calculated with stored calibration data from the measuring signal. For example, if the measurement signal is the transit time of a microwave signal of a fill level meter using the radar principle, information can be obtained using reference data—in particular, via the distance between an antenna used for the measurement and the tank, which contains the medium to be measured—about the fill level of the medium reflecting microwave signals.

The measurement signal can be output or, for example, displayed as an analog or digital output signal. In particular, the use of so-called 4 . . . 20 mA signals has spread in process automation. Here, information is transmitted using the current of the output signal, which, in the normal case, lies between 4 mA and 20 mA. In such signals, an error is indicated in that the current lies outside of the 4 to 20 mA range. Thus, in a variation, in particular, the current of the output/error signal is less than 4 mA.

In addition to the detection of an error, it is important that the measuring arrangement reliably indicates such an error, if one takes place.

SUMMARY OF THE INVENTION

A primary object of the present invention is thus to provide a measuring arrangement and a method for generating an output signal that will ensure reliable outputting of an error signal that indicates the presence of an erroneous state.

The measuring arrangement according to the invention, in which the previously derived and identified object is met is initially and essentially wherein a first adjusting unit and a second adjusting unit are provided. The first adjusting unit and the second adjusting unit are designed and attuned to one another so that the first adjusting unit and the second adjusting unit set the value of the current of the output signal to a predetermined desired value. Here, the first adjusting unit sets a predetermined fixed current value and the second adjusting unit sets a variable current value. The variable current value depends, in a particular design, at least on the desired value and the fixed current value.

The measuring arrangement according to the invention has two adjusting units that adjust the current of the output signal. The desired current to be reached, which represents either the measured value or indicates an error, is therefore composed of at least two components—i.e., especially from two different currents that complement one another in an additive manner into the desired current in one design. One of the two partial currents is a fixed, i.e., constant and always has the same value, and the other partial current is variable and adaptable to the measured value to be transmitted, or respectively, to the indicated error state of the measuring arrangement. Thus, in one design, the variable current value is given by the difference between the desired value of the current and the fixed current value. If both set current values are added, the result is the desired value of the current for the output signal.

Because the fixed current value can be predetermined, it is provided in one design that the fixed current value is assigned to an error state. This means that the first adjusting unit continuously adjusts such a current for the output signal, whose value is equal to an error state. Thus, an error signal is constantly applied to the signal output, which is suitably superimposed by setting the current using the second adjusting unit in order to obtain the associated signal current of the normal or regular state.

Therefore, according to one design, a control unit is provided, which sets the variable current value via the second adjusting unit depending on the desired value and which, in the case that there is an error state in the measuring arrangement, interrupts the setting of the variable current value by the second adjusting unit. The control unit is connected here, in one design, with the sensor device, and in the normal case, receives the measured values from it, the current of the output signal being set for its output. This setting is done via the second adjusting unit and the variable current value. In one design, the sensor device may also be a part of the control unit or completely merge with it into one unit. In a further design, the second adjusting unit is part of the control unit.

If the control unit interrupts the setting of the variable current via the second adjusting unit, in the case that there is an error in the measuring arrangement, the current of the output signal is obtained only by the fixed current value. This happens almost automatically, and solely due to an action—setting the variable current—being omitted or suppressed.

To terminate the setting of the variable current reliably, it is provided in one design that the control unit, in the case that an error state exists in the measuring arrangement, interrupts a power supply of the second adjusting unit. If, in particular, it is the only power supply to the second adjusting unit, setting of the variable current via the second adjusting unit is—in the case of error—no longer possible.

With respect to the arrangement of the elements and components in the measuring arrangement, the first adjusting unit and the second adjusting unit are parallel to one another and/or parallel to the signal output in one design.

It is provided in one design that the sensor device is used in flow measurement using the vortex principle. An alternative design provides that the flow rate is measured as a measured variable by a MID sensor device, or using the Coriolis flowmeter principle. Alternatively, the sensor device is used in fill level or distance measurement according to the radar principle. Other measurement methods, however, can also be implemented.

The previously derived and described object is achieved according to another teaching of the invention with the method described in the introduction in that the current value of the output signal is set to a specified desired value in that at least one definable fixed current value and at least one variable current value is set for the output signal. In one design, the variable current value is dependent on the desired value and the fixed current value.

The above designs for a measuring arrangement or its embodiments apply also for the method. Conversely, the method and its designs can be implemented when the following designs of the above measuring arrangement are taken into consideration.

In order to set the output signal in the method according to the invention, the current is set using at least two different components: a fixed and a variable current value. Both current values are complementary to the desired value of the current, which signals the measured value to be transmitted, or respectively, the state of the measuring arrangement. Here, the fixed current value is always constant and unchanging, whereas the variable current value also allows the adaptation to—in general—the desired value that is also subject to the change.

According to one design, in the event that there is an error state of the measuring arrangement, the setting of the variable current value is interrupted. If the variable current value is not set, then the current value of the output signal automatically results using the fixed current value. Therefore, such a value that is associated with the presence of an error state, i.e., is, for example, less than 4 mA, is defined as a fixed value in one design. This also shows the advantage of the method that two settings together cause the desired value of the current of the output signal, in that the termination of a setting automatically leads to the current of the output signal being given by the fixed current value. The signaling of an error is thus, in the method according to the invention, not caused by an active setting of an error value, rather the additional setting using the variable current is omitted.

In one design, it is provided, in particular that, in the event that there is an error state in the measuring arrangement, the setting of the fixed current value is maintained. The setting of the fixed current value is, therefore, not interrupted in this design when an error occurs, in contrast to the setting of the variable current value, so that, in the case of an error state, the current of the output signal is determined only using the fixed current value.

In detail, there are a variety of options for designing and further developing the measuring arrangement according to the invention as will be apparent from the following description of embodiments in conjunction with the accompanying drawings.

DETAILED DESCRIPTION OF THE INVENTION

Figure 1:
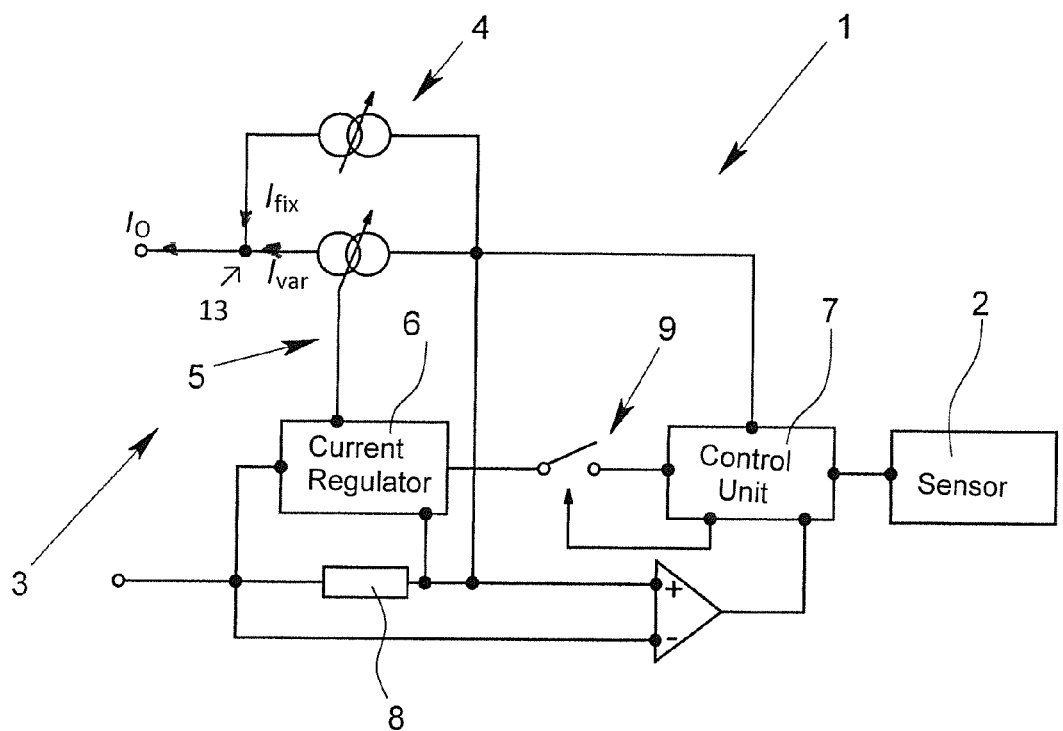
FIG. 1 a schematic representation of a measuring arrangement essentially illustrative of functional relationships using a block diagram and FIG. 2 a schematic representation of a sensor device for use in a measuring arrangement according to FIG. 1.

FIG. 1 shows an embodiment of a measuring arrangement 1, wherein the figure is not a representation in terms of a proper electrical circuit diagram, but the cause-effect relationships between the various components of the measuring arrangement 1 can be seen. Additionally, an example of a sensor device 2 is shown schematically in FIG. 2.

FIG. 1 schematically shows the structure of a measuring arrangement 1. A sensor device 2 is provided for the determination of a measured variable, the sensor device being used, for example, for flow measurement of a flowable medium through a pipe.

The determined measured value is transmitted, for example, via a signal output 3 to a control room—not shown here.

The output signal is, in particular, a so-called 4 . . . 20 mA signal, wherein information about the measured value is transmitted via the current of the output signal. Thus, a correlation is made between the current range between 4 mA and 20 mA and the range of the expected measurement values between the smallest and the largest measured values. In one embodiment, the measured values are linearly associated with the currents. Therefore, an amplitude of 4 mA of the output signal means that the lowest measured value has been determined and an output signal of 20 mA is used for transmitting the information that the largest measured value is present.

In order to signal the presence of an error state of the measuring arrangement 1 according to the prior art, an output signal is generated with a current value that is outside the range of between 4 mA and 20 mA. For example, a current of 0 mA is interpreted as the presence of an error.

The illustrated measuring arrangement 1 allows the presence of an error to be reliably signaled or, respectively, the corresponding error signal to be certainly issued. In particular, it is possible to output an error signal that is different from 0 mA. The emphasis here is that the current value of the output signal is certainly set.

The current of the output signal is set in the measuring arrangement 1 by a first adjusting unit 4 and a second adjusting unit 5. The first adjusting unit 4 is designed to be relatively simple and only sets a fixed current value $I_{fix}$. The second adjusting unit 5 has an independent current regulator 6, which is operated by the control unit 7 and thus also obtains the specifications for setting the current value. The second adjusting unit 5 generates a variable current value $I_{var}$.

In normal operation, a current value is set for the output signal by the first adjusting unit 4 and the second adjusting unit 5, which as desired value corresponds to the measured value determined by the sensor device 2. Here, the set current value is composed of the fixed part $I_{fix}$, which is set by the first adjusting unit 4, and the variable part $I_{var}$, which is set by the second adjusting unit 5. The variable current value $I_{var}$ is set depending on the respective measured value and the fixed current value $I_{fix}$.

Overall, an output signal results with a desired value of the current as the sum of the fixed current value $I_{fixed}$ and the variable current value $I_{var}$ and, at the same time, depending on the measured value.

Therefore, the following sequence results: a measured value is determined from a measurement with the sensor device 2, to which is assigned a desired value of the current of the output signal via a predetermined correlation. The setting of the current is composed of an unchanging or a fixed and a variable component. The variable component, in the form of the variable current value $I_{var}$ is set in the embodiment shown in that the difference between the desired value and the fixed current value $I_{fix}$ is used.

The overall set current value of the output signal is read back via a resistor 8 and is supplied to the control unit 7 in order to carry out a suitable correction via the second adjusting unit 5 or to determine, in an alternative variation, whether there is an error in the sense that the output signal does not correspond to the desired value.

If an error is detected or the sensor device 2 signals that there is an error, then the control unit 7 interrupts contact with the current regulator 6 in that the switch 9 between the two is opened. In an alternative design—not shown—the sensor device 2 acts on the switch 9 and stops, in the case of error (e.g., in the measurement), the connection between the second adjusting unit 5 and the control unit 7.

In the illustrated embodiment of the measuring arrangement 1, the current regulator 6 is supplied with power from the control unit 7, so that an interruption of the connection means that the current regulator 6 goes to an idle state, and thus, as part of the second adjusting unit 5, also does not set a variable current value $I_{var}$. Thus, $I_{var}$ drops to zero and the current of the output signal is determined only by $I_{fix}$.

Because $I_{fix}$ is predetermined, a value is preferably used that corresponds to an error current—especially a value less than 4 mA.

Thus, in the event of an error, the current of the output signal automatically drops to the value of the error current, which is the same as the fixed value $I_{fix}$, and for this reason, the presence of an error state is automatically displayed.

Figure 2:
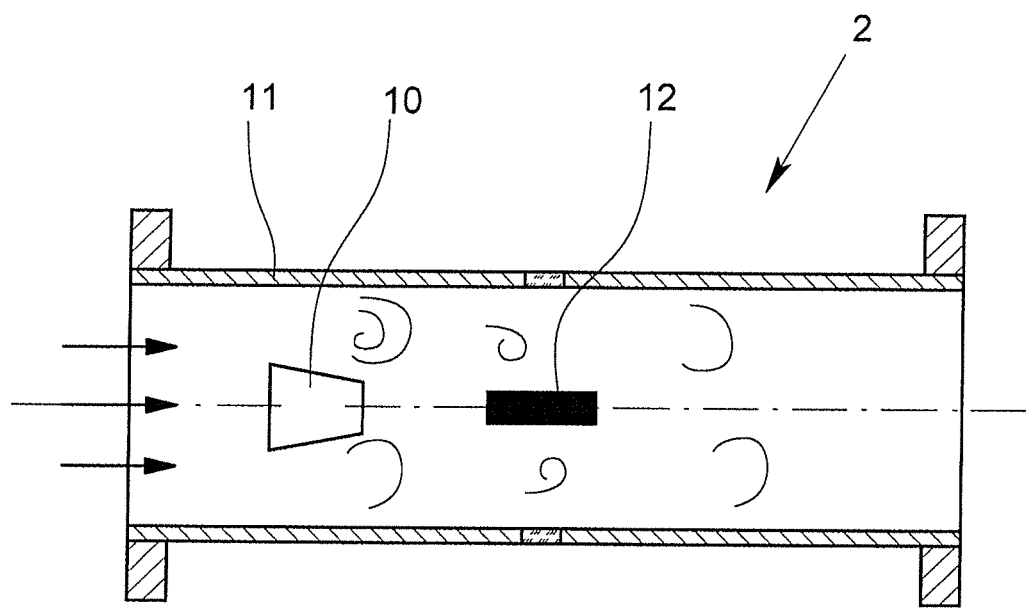

FIG. 2 shows an example of a sensor device 2 of a vortex flowmeter for fluid media (indicated by arrows). The measuring principle of such measuring devices is based on the possibility of a so-called Karman vortex street being formed in the flowing media behind a bluff body 10, which the medium flows around in a measuring tube 11, the vortex street being formed by vortices moving along with the current and detaching from the bluff body 10. The frequency at which the vortices detach from the bluff body 10 is dependent on the flow velocity, wherein the relationship, under certain conditions, is nearly linear. Thus, the flow velocity of the medium can be determined via the measurement of the vortex frequency with a recording unit 12.

What is claimed is:

1. Measuring arrangement for determining at least one measured variable, comprising:
    at least one sensor device,
    at least one signal output for outputting at least one output signal which transmits information from the at least one sensor device about at least one of a measured variable and a state of the measuring arrangement using at least one predetermined value of current,
    a first adjusting unit, and
    a second adjusting unit;
    wherein the first adjusting unit and the second adjusting unit are configured and attuned to one another so that the first adjusting unit and the second adjusting unit set the value of the current of the output signal to a predetermined desired value by adding a predetermined fixed current value set by the first adjusting unit and a variable current value set by the second adjusting unit.

2. Measuring arrangement according to claim 1, wherein the variable current value is obtained from a difference between the desired value and the fixed current value.

3. Measuring arrangement according to claim 1, wherein the fixed current value is associated with an error condition.

4. Measuring arrangement according to claim 1, further comprising a control unit which sets the variable current value via the second adjusting unit in dependence on the desired value and wherein the control unit, in the case that there is an error condition in the measuring arrangement, interrupts setting of the variable current value by the second adjusting unit.

5. Measuring arrangement according to claim 4, wherein the control unit, in the event that there is an error condition in the measuring arrangement, interrupts power supply to the second adjusting unit.

6. Measuring arrangement according to claim 1, wherein the first adjusting unit and the second adjusting unit are at least one of parallel to one another and parallel to the signal output.

7. Measuring arrangement according to claim 1, wherein the sensor device is a vortex flow measurement sensor device.

8. Method for producing an output signal transmitting at least one piece of information about at least one of a measured variable and a state of a measuring arrangement by a value of a current of the output signal, comprising the steps of:
    setting the current value of the output signal to a predetermined desired value
    by setting at least one predetermined fixed current value and at least one variable current value for the output signal and
    by adding the predetermined fixed current value and the variable current value.

9. Method according to claim 8, wherein, in the event that there is an error condition of the measuring arrangement, setting of the variable current value is interrupted.

10. Method according to claim 8, wherein, in the event that there is an error condition of the measuring arrangement, setting of the fixed current value is maintained.

* * * * *